(12) United States Patent
Zhang et al.

(10) Patent No.: US 11,982,363 B2
(45) Date of Patent: May 14, 2024

(54) FAUCET WITH INTEGRATED MANUAL AND AUTOMATIC FLOW CONTROL

(71) Applicant: XIAMEN OLT CO., LTD., Xiamen (CN)

(72) Inventors: Songgen Zhang, Xiamen (CN); Jiaming Hong, Xiamen (CN); Zhenguo Zhang, Xiamen (CN)

(73) Assignee: XIAMEN OLT CO., LTD., Xiamen (CN)

( * ) Notice: Subject to any disclaimer, the term of this patent is extended or adjusted under 35 U.S.C. 154(b) by 139 days.

(21) Appl. No.: 17/777,987

(22) PCT Filed: Nov. 19, 2020

(86) PCT No.: PCT/CN2020/130143
§ 371 (c)(1),
(2) Date: May 18, 2022

(87) PCT Pub. No.: WO2022/088312
PCT Pub. Date: May 5, 2022

(65) Prior Publication Data
US 2022/0412472 A1 Dec. 29, 2022

(30) Foreign Application Priority Data
Oct. 29, 2020 (CN) .......................... 202011179518.8

(51) Int. Cl.
F16K 11/074 (2006.01)
E03C 1/05 (2006.01)
(Continued)

(52) U.S. Cl.
CPC .......... F16K 11/0743 (2013.01); E03C 1/055 (2013.01); F16K 31/0617 (2013.01); F16K 31/0675 (2013.01); F16K 31/60 (2013.01)

(58) Field of Classification Search
CPC ... F16K 11/0743; F16K 31/0617; E03C 1/055
See application file for complete search history.

(56) References Cited

U.S. PATENT DOCUMENTS 5,896,601 A * 4/1999 Humpert ............. F16K 11/0787
4/677
8,613,293 B2 * 12/2013 Bolgar ................ F16K 11/0743
137/625.46
(Continued)

FOREIGN PATENT DOCUMENTS

CN 101078443 A 11/2007
CN 102466060 A 5/2012
(Continued)

OTHER PUBLICATIONS

International Search Report issued in corresponding International application No. PCT/CN2020/130143, mailed Jun. 24, 2021.
(Continued)

Primary Examiner — Reinaldo Sanchez-Medina

(57) ABSTRACT

A faucet with integrated manual and automatic flow control, which includes a faucet body, a valve, a handle, a cold water inlet pipe, a hot water inlet pipe, a water outlet pipe, a sensing unit and a control device. The valve and the control device are both arranged inside the faucet body. The handle is arranged on one side of the faucet body and is connected with one end of the valve, the other end of the valve is connected with the control device. The sensing unit is arranged on the faucet body and is electrically connected with the control device. The cold water inlet pipe and the hot water inlet pipe are both connected to one end of the water outlet pipe through the valve.

8 Claims, 7 Drawing Sheets

(51) Int. Cl.
*F16K 31/06* (2006.01)
*F16K 31/60* (2006.01)

(56) References Cited

U.S. PATENT DOCUMENTS

| | | | | |
|---|---|---|---|---|
| 8,695,635 B1* | 4/2014 | Wang | ............... | F16K 11/0787 |
| | | | | 137/625.42 |
| 2003/0145889 A1* | 8/2003 | Knapp | ............... | F16K 11/0743 |
| | | | | 137/454.6 |
| 2006/0162793 A1* | 7/2006 | Di Nunzio | ......... | F16K 11/0787 |
| | | | | 137/625.46 |
| 2012/0248351 A1* | 10/2012 | Huang | ............... | F16K 27/045 |
| | | | | 251/129.01 |
| 2015/0211653 A1 | 7/2015 | Isenhour et al. | | |

FOREIGN PATENT DOCUMENTS

| | | |
|---|---|---|
| CN | 109340389 A | 2/2019 |
| CN | 109488788 A | 3/2019 |
| CN | 111677908 A | 9/2020 |

OTHER PUBLICATIONS

Written Opinion of the International Search Authority in corresponding International application No. PCT/CN2020/130143.

* cited by examiner

FAUCET WITH INTEGRATED MANUAL AND AUTOMATIC FLOW CONTROL

CROSS-REFERENCE TO RELATED PATENT APPLICATIONS

This application is a national stage entry of International Application No. PCT/CN2020/130143, filed on Nov. 19, 2020, which is based upon and claims priority to Chinese Patent Application No. 202011179518.8, filed on Oct. 29, 2020, which is incorporated by reference herein in its entirety.

TECHNICAL FIELD

The present disclosure relates generally to the technical field of faucets. More specifically, the present disclosure relates to a faucet with integrated manual and automatic flow control.

BACKGROUND

Faucets with multiple inlets and multiple outlets are commonly used in shower rooms or toilets, etc. The operations of existing faucets with two inlets and two outlets are controlled by one valve, and by operating or rotating a drive shaft of the valve, the water passage may be turned on or off and the water temperature may be regulated.

Currently, it is common that two faucets are provided together, one is controlled automatically, and the other is controlled manually. In this situation, the valve should ensure the constant water supply of one waterway, and make sure that it has temperature regulation function. Therefore, a need exists for improved technology of novel hot and cold water mixing valve with two inlets and two outlets.

Further, the movable pieces of known valves only have one water guiding channel, which makes it complex to operate the faucet, so it would take time for users to learn the selection and control of two water passages, resulting in poor user experience for new users.

SUMMARY

The present disclosure provides a faucet with integrated manual and automatic flow control, which may effectively address the above-mentioned problems.

The present disclosure provides the following solution.

A faucet with integrated manual and automatic flow control, including a faucet body, a valve, a handle, a cold water inlet pipe, a hot water inlet pipe, a water outlet pipe, a sensing unit and a control device. The valve and the control device are both arranged inside the faucet body. The handle is arranged on one side of the faucet body and is connected with one end of the valve, the other end of the valve is connected with the control device. The sensing unit is arranged on the faucet body and is electrically connected with the control device. The cold water inlet pipe and the hot water inlet pipe are both connected to one end of the water outlet pipe through the valve. The valve includes a movable piece and a static piece, and the movable piece is movably attached to the static piece. The static piece has a cold water inlet hole, a hot water inlet hole, a first water outlet hole and a second water outlet hole. The cold water inlet pipe communicates with the cold water inlet hole, and the hot water inlet pipe communicates with the hot water inlet hole. The movable piece has a water guiding channel, a first water passage hole and a second water passage hole. The first water passage hole and the second water passage hole are connected through a water passage. Movement of the movable piece may set the valve to the following two water outlet modes: under the first water outlet mode, the first water passage hole is connected to the cold water inlet hole and/or the hot water inlet hole, the second water passage hole is connected to the second water outlet hole, and the first water outlet hole is in no connection to any of the water inlet holes. Under the second water outlet mode, the first water outlet hole communicates with the cold water inlet hole and/or the hot water inlet hole through the water guiding channel, the first water passage hole communicates with the cold water inlet hole and/or the hot water inlet hole, and the second water passage hole communicates with the second water outlet hole.

As a further improvement, movement of the movable piece may also set the valve to a third water outlet mode. Under the third water outlet mode, the first water outlet hole is in no connection to any of the water inlet holes, and the second water outlet hole is in no connection to any of the water inlet holes.

As a further improvement, a sliding piece is coupled to the movable piece in a transmission connection to move synchronously with the movable piece. The water passage is provided between the movable piece and the sliding piece.

As a further improvement, a base is coupled to the sliding piece in a transmission connection, the base drives the sliding piece to rotate, and a control shaft is rotatably connected to the base. The control shaft drives the base to rotate, and a bottom end of the control shaft is coupled with the sliding piece in a transmission connection to drive movement of the sliding piece.

As a further improvement, the static piece is fixed on a bottom cover, and the bottom cover has four through holes respectively communicating with the cold water inlet hole, the hot water inlet hole, the first water outlet hole and the second water outlet hole.

As a further improvement, the bottom cover is provided with snap-fit engaging elements connected with a casing in a snap-fit manner, and the bottom cover and the casing jointly form an installation chamber. The static piece, the movable piece, the sliding piece and the base are all located in the installation chamber.

As a further improvement, an inner sidewall of the casing is provided with a limit block for limiting a rotation angle of the base.

As a further improvement, a top portion of the movable piece is provided with a first annular groove communicating with the first water passage hole and the second water passage hole. A bottom portion of the sliding piece is provided with a second annular groove opposite to and corresponds with the first annular groove. The first annular groove and the second annular groove jointly form the water passage, and sealing rings are respectively provided on an inner side and an outer side of the second annular groove.

As a further improvement, a top portion of the sliding piece has a recess, and the bottom end of the control shaft is inserted in the recess to drive movement of the sliding piece.

As a further improvement, the faucet further includes a shower head connected with the water outlet pipe.

The present disclosure has the following advantages. According to the present disclosure, the handle provided on a side of the faucet body is connected with one end of the valve provided inside the faucet body, and the other end of the valve is connected with the control device provided inside the faucet body. The sensing unit arranged on the faucet body is electrically connected to the control device. The cold water inlet pipe and the hot water inlet pipe are both connected to one end of the water outlet pipe through the valve. The movable piece of the valve is provided with a water guiding channel and a water passage which are respectively connected to the first water outlet hole and the second water outlet hole. As a result, operation of the valve of the present disclosure is simplified with a simpler and more compact structure, and improved user experience.

BRIEF DESCRIPTION OF THE DRAWINGS

In order to clearly explain the embodiments of the present disclosure, the drawings that would be used in describing the embodiments will be briefly introduced below. It should be understood that the drawings illustrated below merely includes some of the embodiments of the present disclosure and should not be considered as limit to the scope of the present disclosure. For those of ordinary skill in the art, other drawings may be derived based on these drawings without creative effort.

REFERENCE NUMBERS

Figure 1:
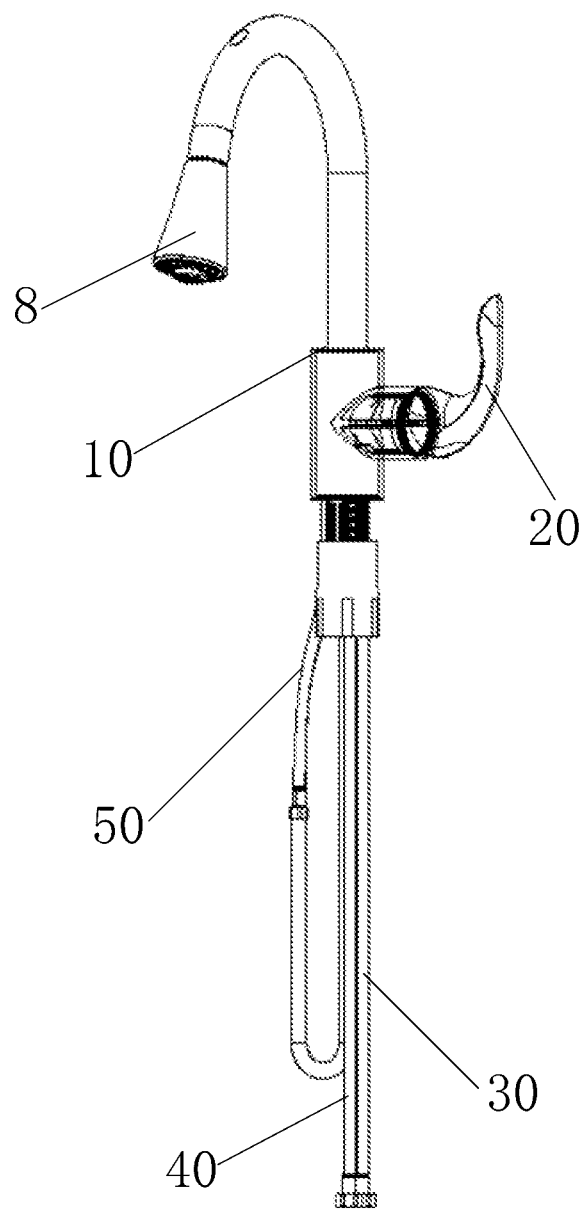
FIG. 1 is a structural schematic diagram of a faucet with integrated manual and automatic flow control according to one embodiment of the present disclosure.
Figure 2:
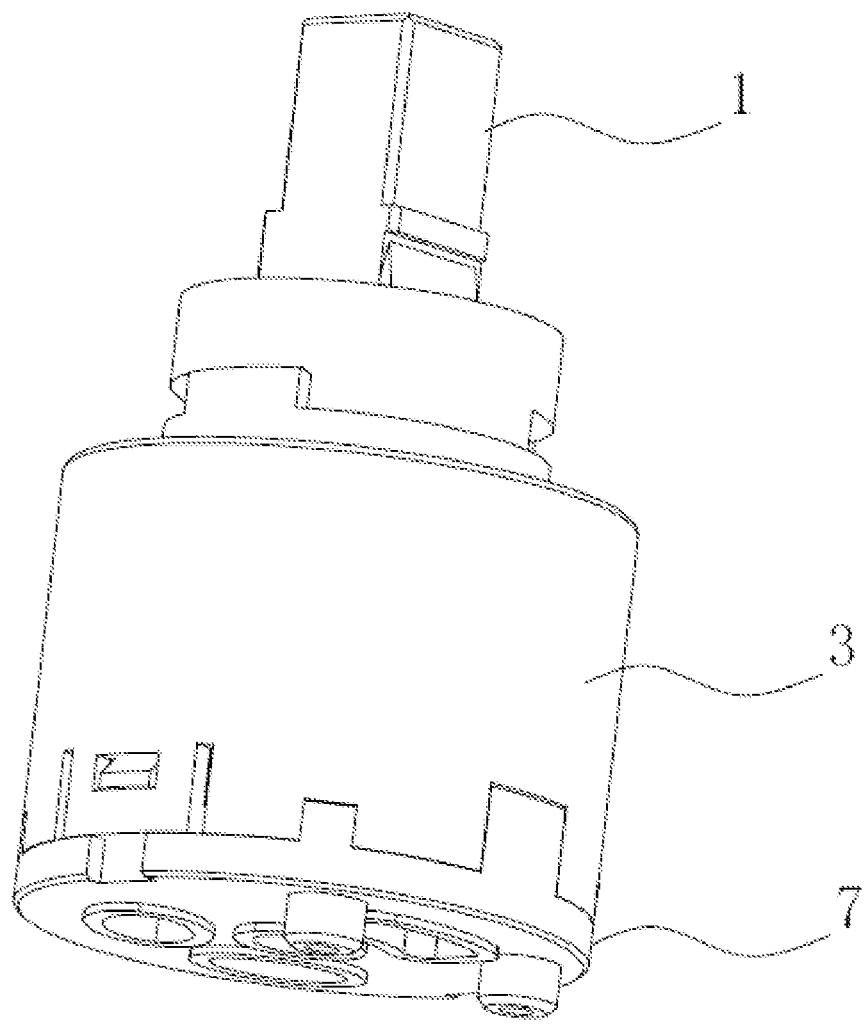
FIG. 2 is a structural schematic diagram of a valve according to one embodiment of the present disclosure.

10—faucet body; 20—handle; 30—cold water inlet pipe; 40—hot water inlet pipe; 50—water outlet pipe; 1—control shaft; 2—base; 21—pin; 22—limit part; 3—casing; 4—sliding piece; 41—recess; 42—second annular groove; 43—sealing ring; 5—movable piece; 51—water guiding channel; 52—first water passage hole; 53—second water passage hole; 6—static piece; 61—cold water inlet hole; 62—hot water inlet hole; 63—first water outlet hole; 64—second water outlet hole; 7—bottom cover; 71—through hole; 72—snap-fit engaging element; 8—shower head.

DETAILED DESCRIPTION OF THE EMBODIMENTS

In order to make the objectives, technical solutions, and advantages of the embodiments of the present disclosure clearer, the technical solutions of the embodiments of the present disclosure will be described clearly and completely below with reference to the drawings of the embodiments of the present disclosure. Obviously, the described embodiments are parts of, but not all of, the embodiments of the present disclosure. Based on the embodiments of the present disclosure, all other embodiments derived by those of ordinary skills in the art without creative effort fall within the scope of protection of the present disclosure. Accordingly, the following detailed description of the embodiments of the present disclosure shown in the drawings is not intended to limit the scope of protection of the present disclosure, but merely to represent selected embodiments of the present disclosure. All other embodiments derived from the embodiments of the present disclosure by those of ordinary skill in the art without creative efforts should be considered as falling within the scope of the present disclosure.

In the description of the present disclosure, the terms "first", "second" are used only for descriptive purposes and cannot be understood as indicating or implying relative importance or implying the number of indicated technical features. Thus, a characteristic that is referred to by "first" and "second" may include, expressly or implicitly, one or more of the characteristics. Also, it should be noted that the terms of "multiple/plurality of" may be interpreted as including two or more items, unless otherwise defined.

Referring to FIGS. 1-7, the present disclosure provides a faucet with integrated manual and automatic flow control, which includes a faucet body 10, a valve, a handle 20, a cold water inlet pipe 30, a hot water inlet pipe 40, a water outlet pipe 50, a sensing unit and a control device. The valve and the control device are both arranged inside the faucet body 10, the handle 20 is provided on a side of the faucet body 10 and is connected to one end of the valve. The other end of the valve is connected to the control device. The sensing unit is arranged on the faucet body 10 and is electrically connected to the control device. Both the cold water inlet pipe 30 and the hot water inlet pipe 40 are connected to one end of the water outlet pipe 50 through the valve. The valve includes a movable piece 5 and a static piece 6, and the movable piece 5 is movably attached to the static piece 6. The static piece 6 has a cold water inlet hole 61, a hot water inlet hole 62, a first water outlet hole 63 and a second water outlet hole 64. The cold water inlet pipe 30 communicates with the cold water inlet hole, and the hot water inlet pipe 40 communicates with the hot water inlet hole. The movable piece 5 has a water guiding channel 51, a first water passage hole 52, and a second water passage hole 53. The first water passage hole 52 and the second water passage hole 53 are connected through a water passage. Movement of the movable piece 5 may set the valve to the following two water outlet modes. Under the first water outlet mode, the first water passage hole 52 is connected to the cold water inlet hole 61 and/or the hot water inlet hole 62, the second water passage hole 53 is connected to the second water outlet hole 64, and the first water outlet hole 63 is in no connection to any of the water inlet holes. Under the second water outlet mode, the first water outlet hole 63 communicates with the cold water inlet hole 61 and/or the hot water inlet hole 62 through the water guiding channel 51, the first water passage hole 52 communicates with the cold water inlet hole 61 and/or the hot water inlet hole 62, and the second water passage hole 53 communicates with the second water outlet hole 64.

In a specific implementation, the control device includes a solenoid valve and a magnetic control sensor. The solenoid valve is arranged on the water outlet pipe 50 and connected to the second water outlet hole 64 to allow or stop the water flow mixed by hot and cold water from passing through the water outlet pipe 50. When the handle 20 is turned off, the water flow mixed by cold and hot water flows to the solenoid valve, and the solenoid valve controls the opening or shutdown of the water flow. The first water outlet hole 63 is provided with a water flow detector, when the handle 20 is turned on, the water flow detector may monitor the flow of water and trigger the magnetic control sensor. In response, a main controller determines that the handle 20 is turned on and closes the solenoid valve. The sensing unit may be an infrared sensing unit or a touch sensing unit. The method to connect the infrared sensing unit or touch sensing unit with the solenoid valve and working principle thereof may be similar to the way that the sensing unit of the conventional automatic faucet is connected to the solenoid valve and how it works. Hence, the connection method and working principle thereof will not be repeated here. Regardless of whether the handle 20 is turned on or off, the water flow mixed by hot and cold water is normally open, and the water outlet is controlled by the solenoid valve. Whether the solenoid valve controls the water outlet or the handle 20 controls the water outlet, the valve may always be rotated to adjust the ratio of cold and hot water to achieve the purpose of regulating the water temperature.

According to the present disclosure, the handle provided on a side of the faucet body is connected with one end of the valve provided inside the faucet body, and the other end of the valve is connected with the control device provided inside the faucet body. The sensing unit arranged on the faucet body is electrically connected to the control device. The cold water inlet pipe and the hot water inlet pipe are both connected to one end of the water outlet pipe through the valve. The movable piece of the valve is provided with a water guiding channel and a water passage which are respectively connected to the first water outlet hole and the second water outlet hole. As a result, operation of the valve of the present disclosure is simplified with a simpler and more compact structure, and improved user experience.

Further, movement of the movable piece 5 may also set the valve to a third water outlet mode. Under the third water outlet mode, the first water outlet hole 63 is in no connection to any of the water inlet holes, and the second water outlet hole 64 is in no connection to any of the water inlet holes.

Figure 3:
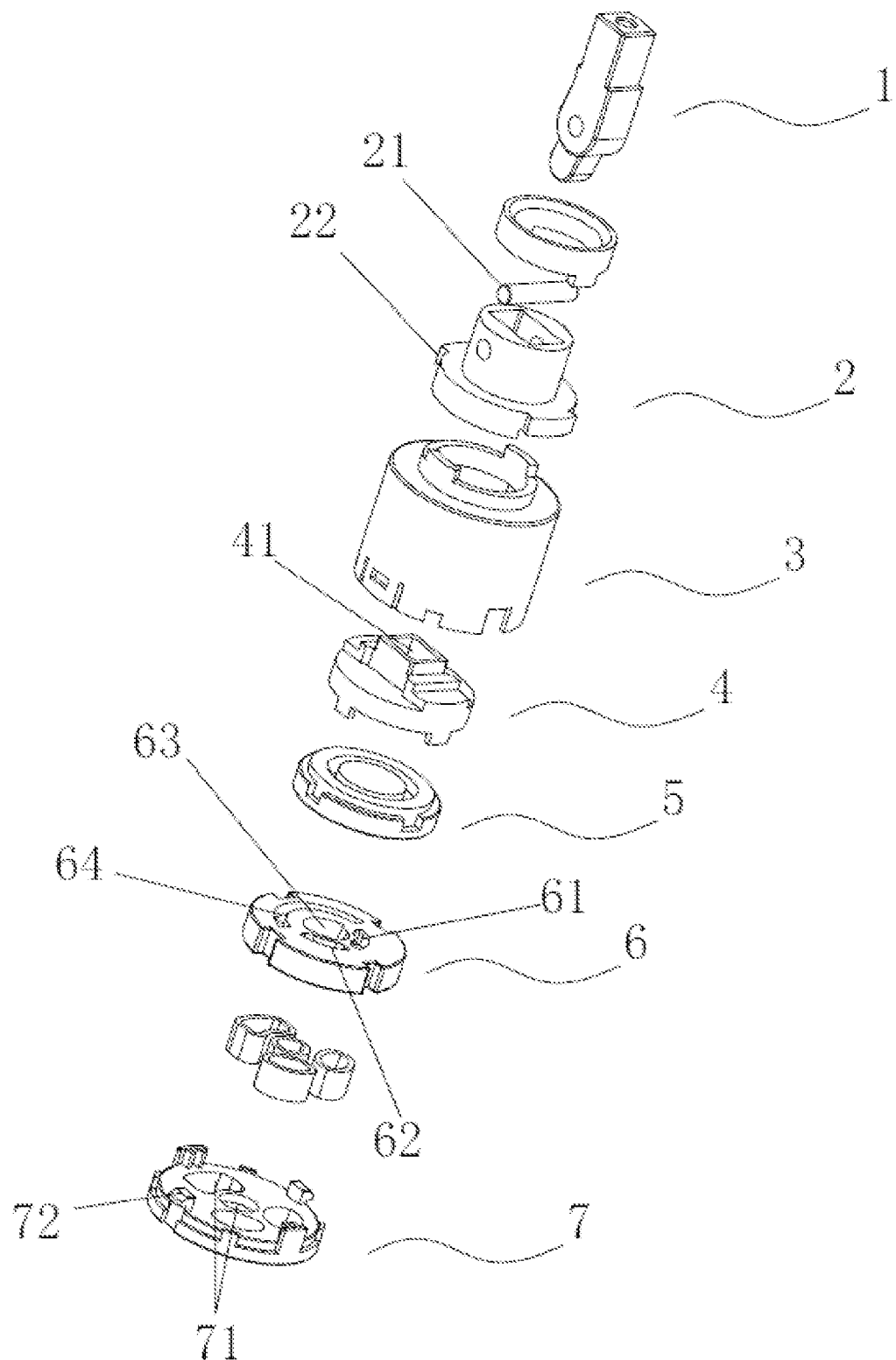
FIG. 3 is an exploded view of the valve according to one embodiment of the present disclosure.
Figure 4:
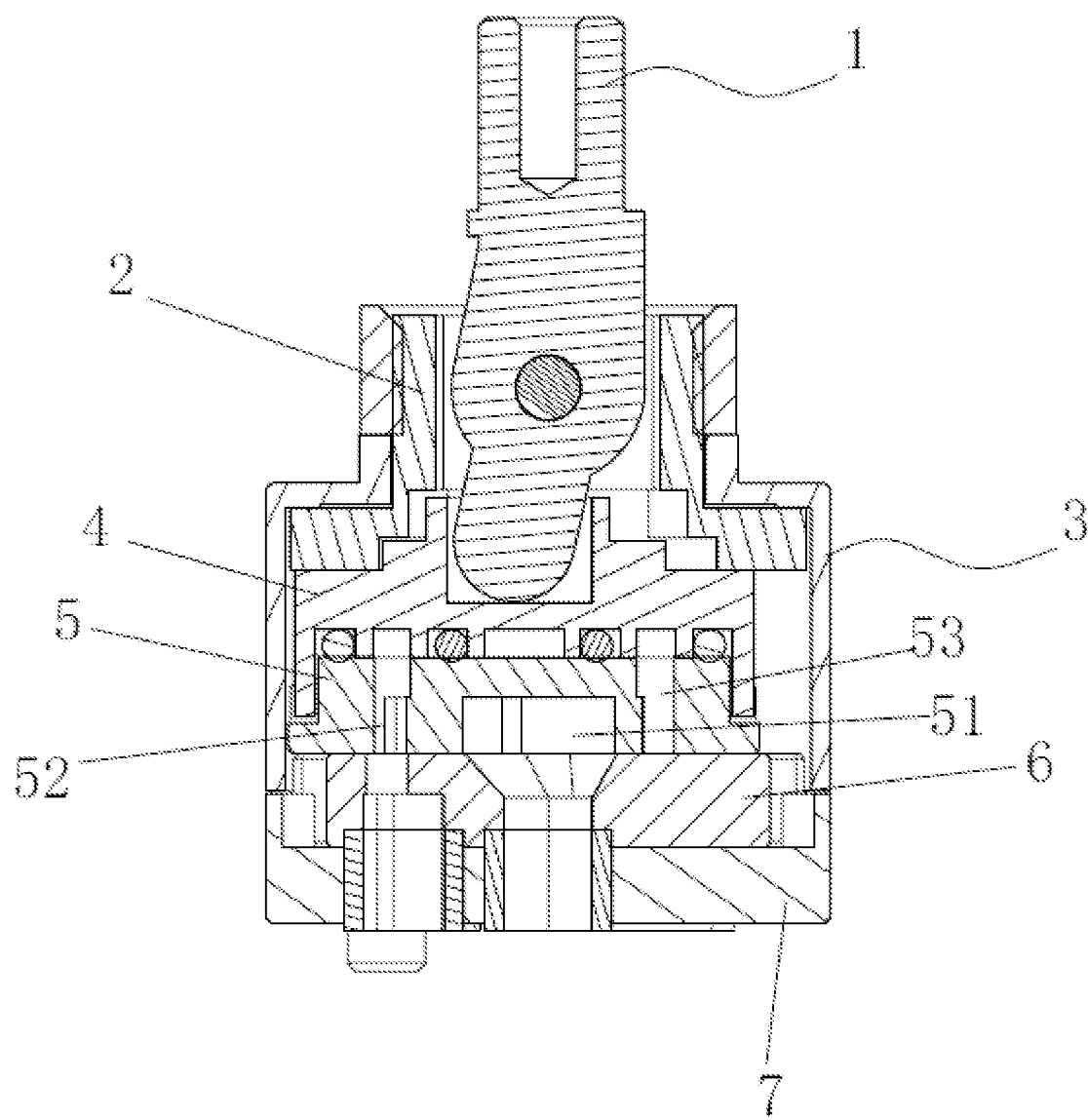
FIG. 4 is a cross-sectional view of the valve according to one embodiment of the present disclosure.
Figure 5:
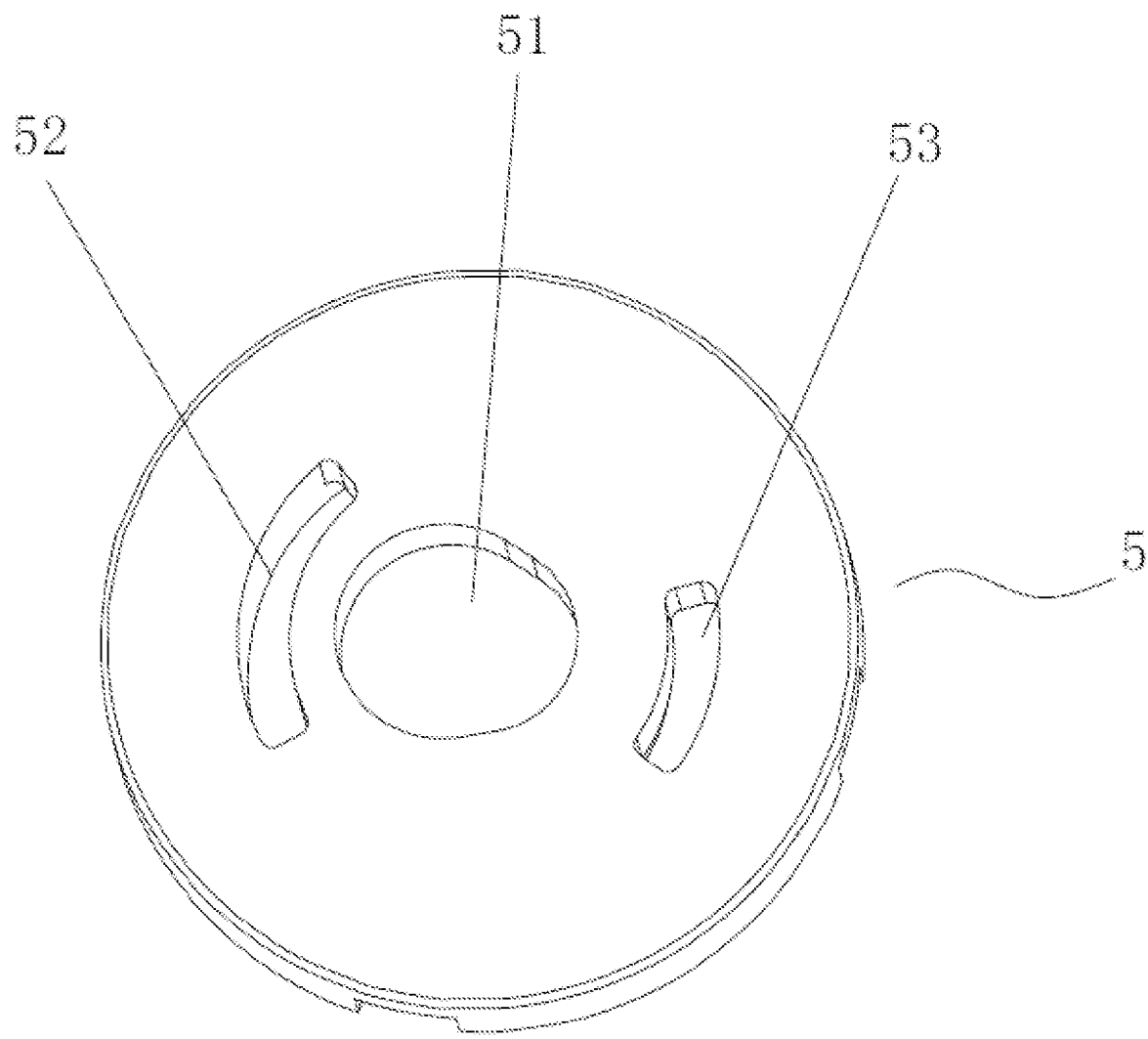
FIG. 5 is a structural schematic diagram of a movable piece 5 according to one embodiment of the present disclosure.
Figure 6:
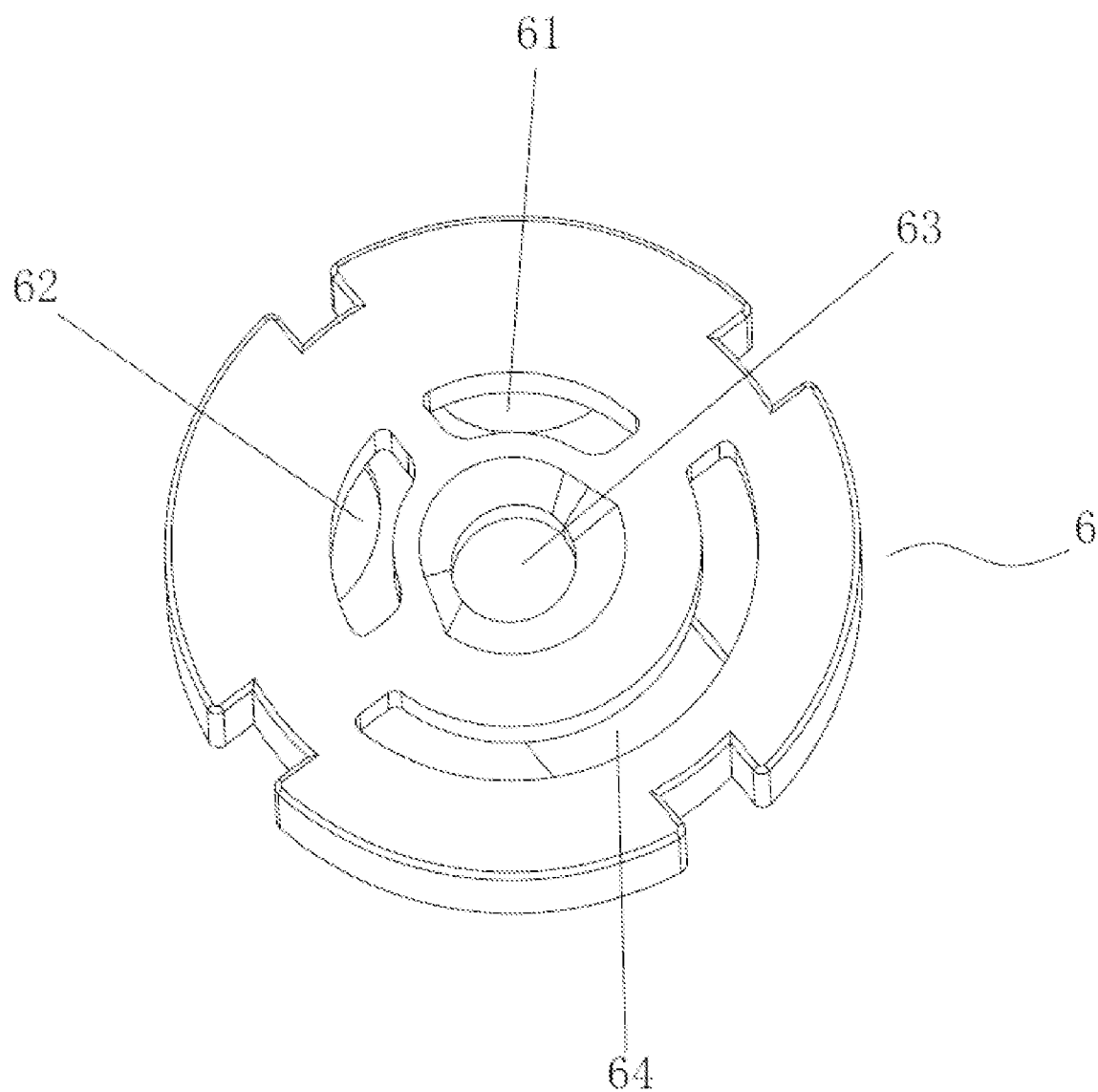
FIG. 6 is a structural schematic diagram of a static piece 6 according to one embodiment of the present disclosure.
Figure 7:
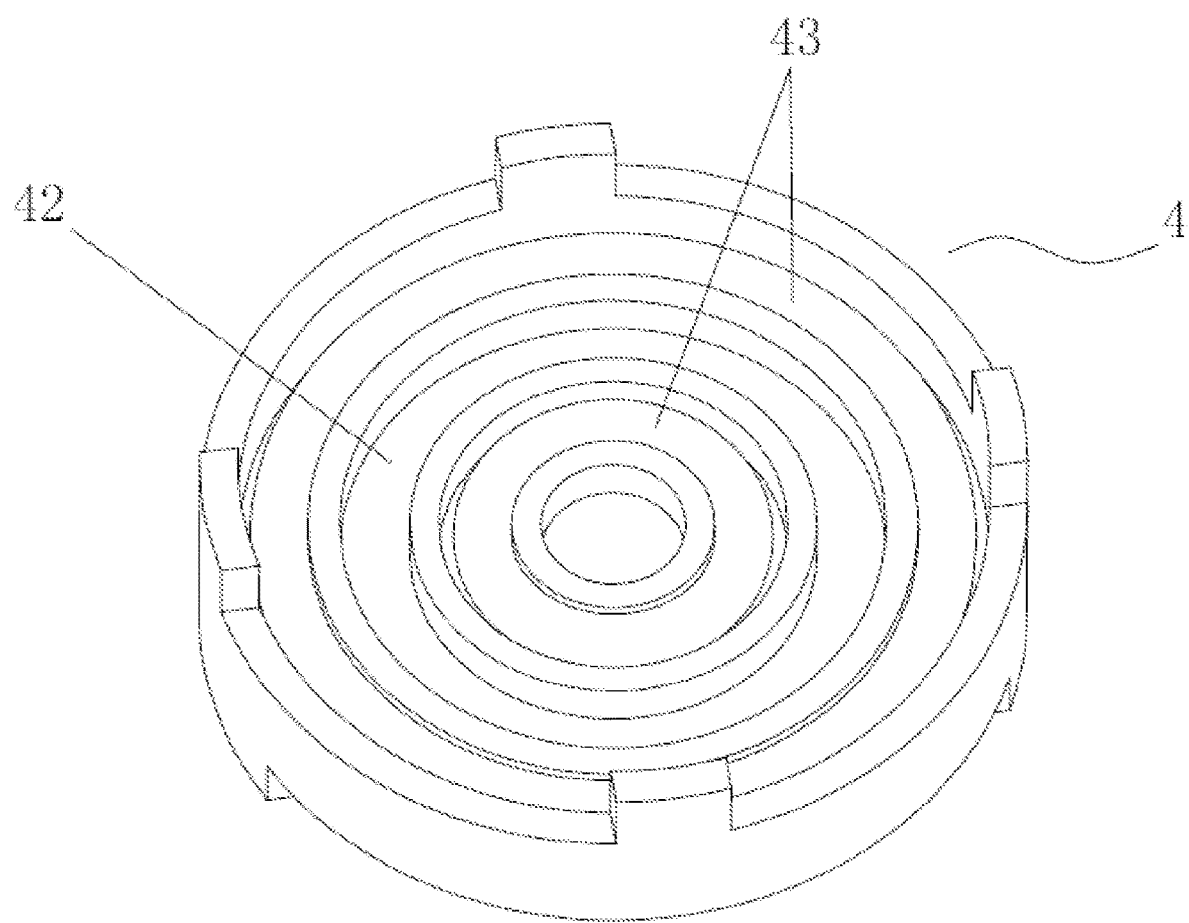
FIG. 7 is a structural schematic diagram of a sliding piece 4 according to one embodiment of the present disclosure.

In a specific implementation, as shown in FIG. 3, the first water outlet hole 63 is in no connection with any of the water inlet holes, and the second water outlet hole 64 is in no connection with any of the water inlet holes. By doing so, the opening or close of the water passage is controlled by changing the relative position of the movable piece 5 and the static piece 6. However, in use, the second water outlet hole 64 usually cooperates with a solenoid valve to control the opening and close of the water passage. Therefore, the second water outlet hole 64 may always at least communicate with one of the cold water inlet hole 61 and the hot water inlet hole 62. By doing so, water always flows through the second water outlet hole 64. Under this situation, the valve in this embodiment is not set to the third water outlet mode, that is, it is only set to the first or second water outlet mode.

Further, a sliding piece 4 is coupled to the movable piece 5 in a transmission connection to move synchronously with the movable piece 5. The water passage is provided between the movable piece 5 and the sliding piece 4.

Further, a base 2 is coupled to the sliding piece 4 in a transmission connection, the base 2 drives the sliding piece 4 to rotate, and a control shaft 1 is rotatably connected to the base 2. The control shaft 1 drives the base 2 to rotate, and a bottom end of the control shaft 1 is coupled with the sliding piece 4 in a transmission connection to drive movement of the sliding piece 4.

Further, the static piece 6 is fixed on a bottom cover 7, and the bottom cover 7 has four through holes 71 respectively communicating with the cold water inlet hole 61, the hot water inlet hole 62, the first water outlet hole 63 and the second water outlet hole 64.

Further, the bottom cover 7 is provided with snap-fit engaging elements which are connected to a casing 3 in a snap-fit manner. The bottom cover 7 and the casing 3 jointly form an installation chamber. The static piece 6, the movable piece 5, the sliding piece 4 and the base 2 are all located in the installation chamber.

In a specific implementation, as shown in FIG. 3, the static piece 6 and the movable piece 5 are both ceramic pieces, and the movable piece 5 is movably attached to the static piece 6. The bottom cover 7 is provided with snap-fit engaging elements 72 which are engaged with the casing 3 in snap-fit manner. The bottom cover 7 and the casing 3 collaboratively form an installation chamber. The static piece 6, the movable piece 5, the sliding piece 4, the base 2, and the control shaft 1 are all arranged in the installation chamber. The static piece 6 is peripherally provided with a plurality of engaging notches. The bottom cover 7 is provided with a plurality of engaging parts to be inserted into the engaging notches. As a result, the static piece 6 is fixedly connected to the bottom cover 7. The static piece 6 has a cold water inlet hole 61, a hot water inlet hole 62, a first water outlet hole 63 and a second water outlet hole 64. The bottom cover 7 is provided with four through holes 71 respectively communicating with the cold water inlet hole 61, the hot water inlet hole 62, the first water outlet hole 63 and the second water outlet hole 64.

Further, an inner sidewall of the casing 3 is provided with a limit block for limiting a rotation angle of the base 2. In this embodiment, as shown in FIG. 3, the inner sidewall of the casing 3 has a limit block for limiting the rotation angle of the base 2, the base 2 is peripherally provided with limit parts 22 which are matched with the limit blocks. During the rotation of the base 2, when the limit parts 22 meet the limit blocks, the rotation of the base 2 is stopped in this direction, and it should turn to rotate in a reverse direction.

Further, a top portion of the movable piece 5 is provided with a first annular groove communicating with the first water passage hole 52 and the second water passage hole 53. A bottom portion of the sliding piece 4 is provided with a second annular groove 42 opposite to and corresponds with the first annular groove. The first annular groove and the second annular groove 42 jointly form the water passage, and sealing rings 43 are respectively provided on an inner side and an outer side of the second annular groove 42.

Further, a top portion of the sliding piece 4 has a recess 41, and the bottom end of the control shaft 1 is inserted in the recess 41 to drive movement of the sliding piece 4.

In a specific implementation, as shown in FIGS. 3, 4, 5 and 7, the movable piece 5 has a water guiding channel 51, a first water passage hole 52, and a second water passage hole 53. The first water passage hole 52 and the second water passage hole 53 are connected through a water passage. The water passage is provided between the movable piece 5 and the sliding piece 4. The top portion of the movable piece 5 is provided with the first annular groove communicating with the first water passage hole 52 and the second water passage hole 53. The bottom portion of the sliding piece 4 is provided with the second annular groove 42 which is opposite to and corresponds with the first annular groove, and the first annular groove and the second annular groove 42 jointly form the water passage. In order to ensure the tightness of the water passage, sealing rings 43 are provided on both the inner and outer sides of the second annular groove 42. The bottom portion of the sliding piece 4 is provided with a plurality of protrusions to be inserted into the movable piece 5, so that the sliding piece 4 and the movable piece 5 may move synchronously. The top portion of the sliding piece 4 is provided with a recess 41, the sliding piece 4 is coupled with the base 2 in a transmission connection. The base 2 drives the sliding piece 4 to rotate, and the control shaft 1 is rotatably connected to the base 2 about a pin 21. The control shaft 1 drives the rotation of the base 2, and the bottom end of the control shaft 1 is inserted in the recess 41 of the sliding piece 4 to drive the movement of the sliding piece 4.

Further, the faucet also includes a shower head 8 connected with the water outlet pipe 50. In this embodiment, as shown in FIG. 1, the shower head 8 is a pull-out shower head 8. When the shower head 8 is not pulled out, the shower head abuts against the water outlet of the faucet body 10.

The above descriptions merely cover the preferred embodiments of the present disclosure which should not be considered as limit to the present disclosure. For those of ordinary skill in the art, the present disclosure may have various modifications and changes. Any modifications, equivalent substitutions, improvements made by a skilled person without departing from the spirit and principle of the present disclosure fall within the scope of the present disclosure.

What is claimed is:

1. A faucet with integrated manual and automatic flow control, comprising a faucet body, a valve, a handle, a cold water inlet pipe, a hot water inlet pipe, a water outlet pipe,
    wherein, the valve is arranged inside the faucet body, the handle is arranged on a side of the faucet body and is connected with an end of the valve, the cold water inlet pipe and the hot water inlet pipe are both connected to an end of the water outlet pipe through the valve;
    the valve comprises a movable piece and a static piece, and the movable piece is movably attached to the static piece, the static piece has a cold water inlet hole, a hot water inlet hole, a first water outlet hole and a second water outlet hole, the cold water inlet pipe communicates with the cold water inlet hole, and the hot water inlet pipe—communicates with the hot water inlet hole, the movable piece has a water guiding channel, a first water passage hole and a second water passage hole, the first water passage hole and the second water passage hole are connected through a water passage;
    movement of the movable piece sets the valve to two water outlet modes: under a first water outlet mode, the first water passage hole is connected to the cold water inlet hole and/or the hot water inlet hole, the second water passage hole is connected to the second water outlet hole, and the first water outlet hole is in no connection to any of the water inlet holes; under a second water outlet mode, the first water outlet hole— communicates with the cold water inlet hole and/or the hot water inlet hole through the water guiding channel, the first water passage hole communicates with the cold water inlet hole and/or the hot water inlet hole, and the second water passage hole communicates with the second water outlet hole;
    a sliding piece is coupled to the movable piece in a transmission connection to move synchronously with the movable piece, and the water passage is provided between the movable piece and the sliding piece;
    a top portion of the movable piece is provided with a first annular groove communicating with the first water passage hole and the second water passage hole, a bottom portion of the sliding piece is provided with a second annular groove opposite to and corresponds with the first annular groove, the first annular groove and the second annular groove jointly form the water passage, and sealing rings are respectively provided on an inner side and an outer side of the second annular groove.

2. The faucet with integrated manual and automatic flow control according to claim 1, wherein movement of the movable piece also sets the valve to a third water outlet mode, under the third water outlet mode, the first water outlet hole is in no connection to any of the water inlet holes, and the second water outlet hole is in no connection to any of the water inlet holes.

3. The faucet with integrated manual and automatic flow control according to claim 1, wherein a base is coupled to the sliding piece in a transmission connection, the base drives the sliding piece to rotate, and a control shaft is rotatably connected to the base, the control shaft drives the base to rotate, and a bottom end of the control shaft is coupled with the sliding piece in a transmission connection to drive movement of the sliding piece.

4. The faucet with integrated manual and automatic flow control according to claim 3, wherein the static piece is fixed on a bottom cover, and the bottom cover has four through holes respectively communicating with the cold water inlet hole, the hot water inlet hole, the first water outlet hole and the second water outlet hole.

5. The faucet with integrated manual and automatic flow control according to claim 4, wherein the bottom cover is provided with snap-fit engaging elements connected with a casing in a snap-fit manner, the bottom cover and the casing jointly form an installation chamber, the static piece, the movable piece, the sliding piece and the base are all located in the installation chamber.

6. The faucet with integrated manual and automatic flow control according to claim 5, wherein an inner sidewall of the casing is provided with a limit block for limiting a rotation angle of the base.

7. The faucet with integrated manual and automatic flow control according to claim 3, wherein a top portion of the sliding piece has a recess, and the bottom end of the control shaft is inserted in the recess to drive movement of the sliding piece.

8. The faucet with integrated manual and automatic flow control according to claim 1, wherein the faucet further comprises a shower head connected to the water outlet pipe.

* * * * *